…

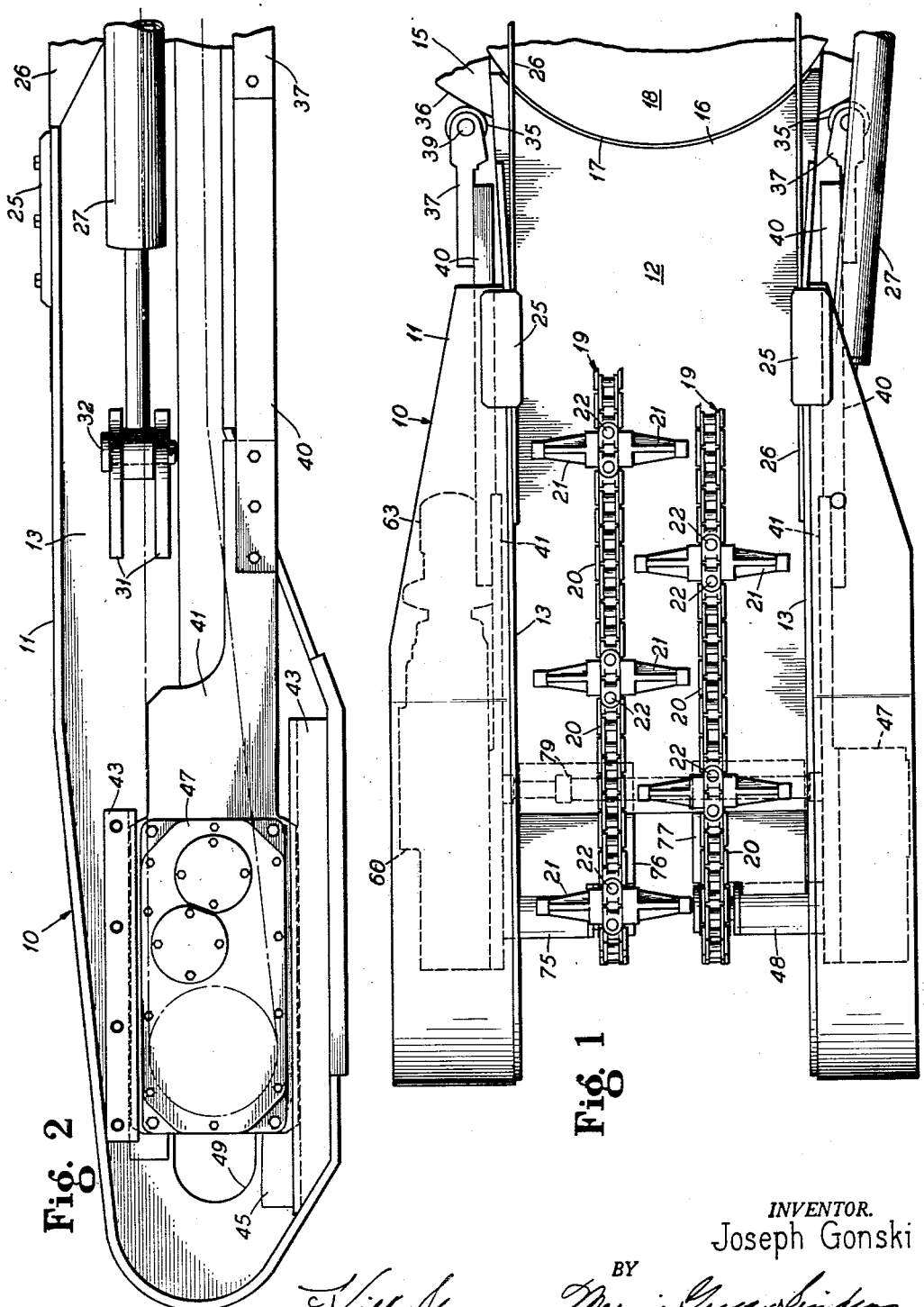

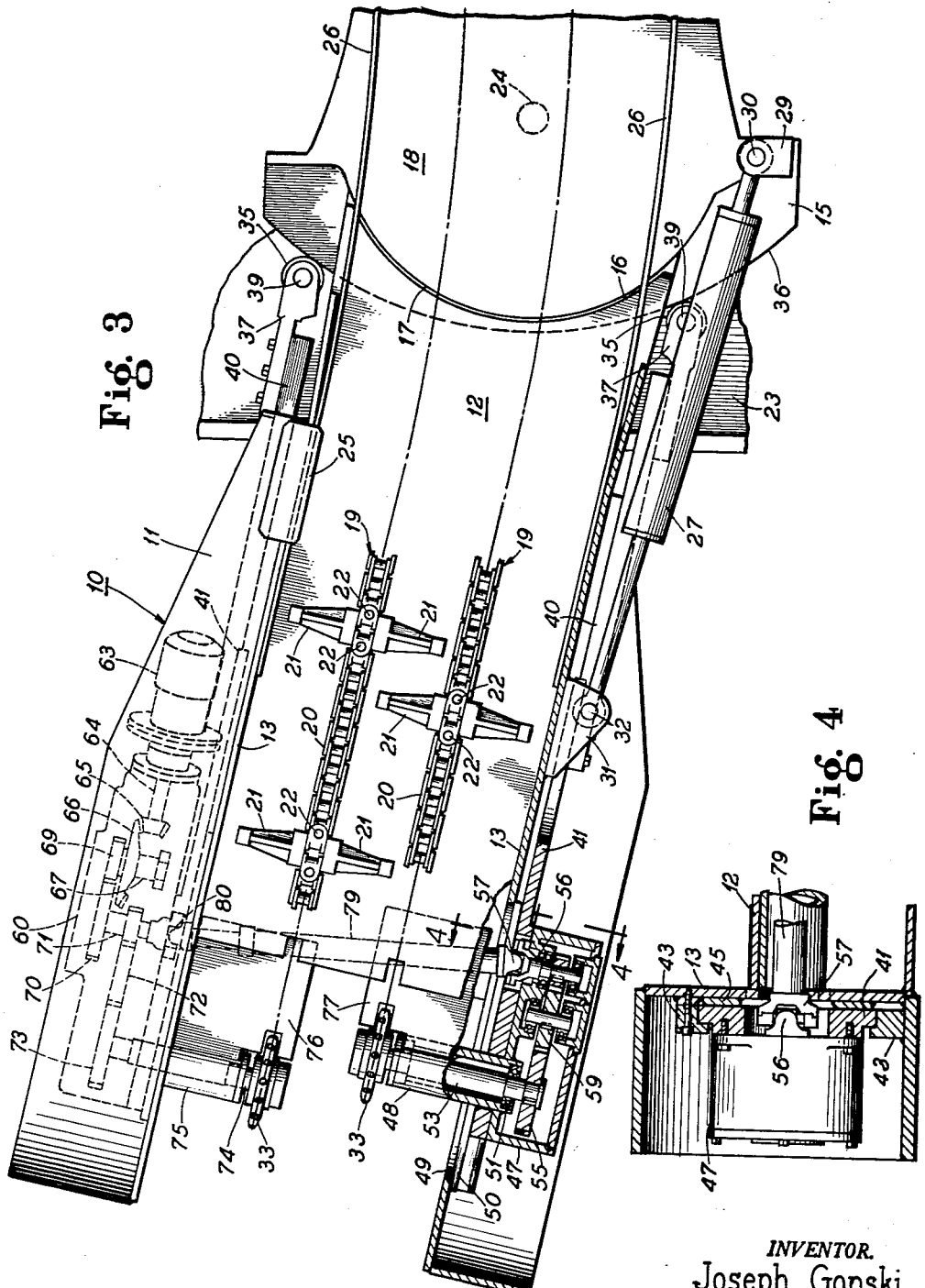

United States Patent Office 3,154,190
Patented Oct. 27, 1964

3,154,190
INTERDIGITATING CONVEYOR
Joseph Gonski, Chicago, Ill., assignor to Goodman Manufacturing Company, Chicago, Ill., a corporation of Illinois
Filed Oct. 12, 1961, Ser. No. 144,668
5 Claims. (Cl. 198—109)

This invention relates to improvements in conveyors and more particularly relates to an improved form of laterally flexible interdigitating chain and flight conveyor and means for synchronizing the flights of the conveyor with respect to each other and maintaining a uniform tension on the conveyor chains in all positions of adjustment thereof.

A principal object of the invention is to provide an improved form of endless chain and flight conveyor of the laterally flexible type, in which two laterally flexible endless chains travel along a conveyor trough and have interdigitating flights, and in which a simple and novel means is provided to maintain uniform tension on the conveyor chains and prevent interference of the interdigitating flights with each other as the conveyor is swung from side to side.

A further object of the invention is to provide a laterally flexible conveyor in which the capacity of the conveyor is increased by utilizing two laterally flexible endless conveyor chains arranged side by side and having interdigitating flights, and in which the flights are synchronized to be maintained in interdigitating relation with respect to each other as the conveyor trough and chains are moved to one side or the other of the longitudinal center of the conveyor, and the path of travel of one chain is lengthened while the path of travel of the next adjacent chain is shortened.

A still further object of the invention is to improve upon the laterally flexible conveyors heretofore in use by providing two laterally flexible chain and flight conveyors traveling along a laterally swingable trough section of the conveyor in side by side relation with respect to each other, by driving the endless chains by individual drive sprockets movable along the trough section of the conveyor, by moving the drive sprockets controlled distances as the trough section is moved to one side or the other of the longitudinal center of the conveyor to maintain uniform tension on the conveyor chains as the trough is adjustably moved to one side or the other of the longitudinal center of the conveyor, and by synchronizing the drive to the sprockets to prevent interference of the flights of the conveyor, as the path of travel of one chain is lengthened and the path of travel of the other chain is shortened.

These and other objects of the invention will appear from time to time as the following specification proceeds and with reference to the accompanying drawings wherein:

FIGURE 1 is a fragmentary plan view of the discharge end portion of a laterally flexible conveyor constructed in accordance with the invention and showing the interdigitating flights of the conveyor traveling along a laterally swingable trough section of the conveyor;

FIGURE 2 is a view in side elevation of the laterally flexible portion of the conveyor shown in FIGURE 1;

FIGURE 3 is a plan view of the discharge end portion of the conveyor shown in FIGURE 1 showing the laterally flexible trough section adjusted to discharge its load to one side of the longitudinal center of the conveyor, with certain parts broken away and certain other parts shown in horizontal section in order to show the synchronized drive to the two chains of the conveyor; and FIGURE 4 is an enlarged sectional view taken substantially along line 4—4 of FIGURE 3.

In the embodiment of the invention illustrated in the drawings, we have shown a conveyor 10 of a type adapted for use with continuous mining machines, to load the mined material onto suitable material transporting means, such as shuttle cars or the like, to be carried away from the machine. The conveyor 10 includes a rear laterally swingable discharge trough section 11 having a bottom plate 12 and parallel spaced side walls 13. The bottom plate 12 overlaps a fan shaped stationary plate 15, and has an arcuate forward end portion 16 conforming to an arcuate rear end portion 17 of a bottom plate 18 of a stationary portion of the conveyor.

The conveyor 10 may be of a type having a pair of separated throats (not shown) converging to a single discharge trough section, as shown and described in an application Serial No. 154,961, filed by John S. Newton, Emil J. Hlinsky and Joseph Gonski on November 27, 1961 and entitled "Continuous Mining Machine." Each throat (not shown) has its own laterally flexible endless chain and flight conveying element 19. The conveying elements 19 comprise strands of chain 20 which may be lengths of roller chains. The strands of chain 20 are pivotally connected at their ends to flights 21 extending laterally in opposite directions from said strands of chain on pivot pins 22 extending perpendicular to the bottom plate 12 of the conveyor. As the two chain and flight conveying elements travel along the converging throats they converge and travel side by side along the trough section 11 between the side walls 13 thereof, and the flights 21 of the two conveying elements interdigitate or extend into the spaces between the flights projecting from each endless chain.

The trough section 11 is pivotally mounted on a main frame 23 of the mining machine on a vertically extending pivot pin 24 (FIGURE 3) in a conventional manner, so not herein shown or described further. The trough section 11 also has guides 25 extending inwardly of the side walls 13 thereof and slidably engaging flexible side walls 26 extending across the plate 18 and connected at their forward ends to the stationary trough section (not shown) of the conveyor, in a conventional manner and confining material to the conveying elements 19 as the trough section 11 is swung laterally to one side or the other of the longitudinal center line of the conveyor. The trough section 11 is swung laterally to one side or the other of its longitudinal centerline and is held in the desired discharge position, by a double acting hydraulic jack 27 pivotally connected at one end to a bracket 29 on the outer side of the plate 18 on a pivot pin 30 and pivotally connected at its opposite end to a bracket 31 extending laterally outwardly of a side wall 13 of the conveyor, on a pivot pin 32.

Each conveyor chain meshes with and turns about a drive sprocket 33 spaced rearwardly of the bottom plate 12. The sprockets 33 are mounted for longitudinal slidable movement along the side walls 13, to take up or relieve tension from the respective conveying elements 19, as the trough section 11 is moved to one side of the other of the centerline of the conveyor under the control of follower rollers 35. The follower rollers 35 engage a rear camming edge 36 of the fan shaped plate 15, to individually take up tension on or release tension from the conveying elements 19 and maintain a uniform tension on the conveying elements in all positions of lateral swinging movement of the discharge trough section 11 with respect to the longitudinal centerline of the stationary portion of the conveyor.

As shown in FIGURE 3, each follower 35 is mounted on the end of a forked bracket 37, between the furcations thereof, on a vertical pivot pin 39. The forked brackets 37 in turn are bolted or otherwise secured to arms 40 extending longitudinally along the outer side walls 13 of the discharge trough section 11.

The arms 40 are each bolted or otherwise secured to the forward end portions of housing support plates 41, guided for movement along the outer sides of the side walls 13, in gibbed guides 43 (FIGURE 4). The gibbed guides 43 are suitably secured to the trough section 11 to extend along the outer sides of the side walls 13 thereof, and engage the top and bottom surfaces of the associated housing support plates 41, and extend along opposite sides of shouldered portions 44 of said housing support plate, for retaining said housing support plate to a bearing plate 45, extending along the outer sides of the side walls 13 of the discharge trough section 11.

The housing support plate 41 on one side of the trough section 11 has a speed reducer housing 47 mounted thereon and extending outwardly therefrom.

A bearing support sleeve 48 is mounted in the housing 47 and plate 41 and extends inwardly of said plate through slotted portions 49 and 50 of the respective side wall 13 and bearing plate 45. The bearing support sleeve 48 has anti-friction bearings 51 mounted in its opposite ends, journalling a drive shaft 53 for the sprocket 33 in said sleeve. The drive shaft 53 extends outwardly of the bearing support sleeve 48 and has the drive sprocket 33 keyed or otherwise secured thereto. The drive shaft 53 also extends within the housing 47 and has a spur gear 55 keyed or otherwise secured thereto. The spur gear 55 is driven through a driven member 56 of a universal coupling 57 through a gear reduction train 59.

The opposite housing support plate 41 from the housing support plate having the housing 47 mounted thereon has a housing 60 mounted thereon. The housing 60 extends outwardly of the housing support plate 41 and has a drive motor 63 mounted on its forward end portion and projecting forwardly therefrom. The drive motor 63 may either be an electric motor or a fluid operated motor and has a motor shaft 64 projecting within the housing 60, having a bevel motor pinion 65 keyed or otherwise secured thereto. The bevel motor pinion 65 meshes with and drives a bevel gear 66 on a shaft 67, suitably journalled within the housing 60 and driving a spur pinion 69 coaxial with said bevel gear. The spur pinion 69 meshes with and drives a spur gear 70 on a transverse shaft 71, suitably journalled within the housing 60. A geared reduction train 72 like the geared reduction train 59 meshes with and drives a spur gear 73 keyed or otherwise secured to a sprocket drive shaft 74 like the sprocket drive shaft 53, and having the sprocket 33 keyed or otherwise secured to its outer end, for driving an associated conveying element 19 at the speed of travel of the next adjacent conveying element 19 driven from the drive shaft 53 and sprocket 33 thereon. The drive shaft 74 is journalled in a sleeve 75 slidably movable with the housing support plate 41 and housing 60. A plate 76 extends partially around the sleeve 75 and forwardly of the sprocket 33 parallel to and along the underside of the bottom plate 12 for the conveyor, and slidably moves with the sleeve 75 and housing support plate 41 to close the gap between the rear end of the bottom plate 12 and drive sprocket 33, as said drive sprocket is adjustably moved toward and from said bottom plate. A similar plate 77 closes the gap between the opposite drive sprocket 33 and the rear end portion of the bottom plate 12.

The rollers 35 are maintained in engagement with the camming edge 36 of the plate 15 by the tension of the individual conveying elements 19, and the camming edge 36 is so formed as to effect outward movement of one drive sprocket 33 and accommodate inward movement of the opposite drive sprocket 33 as the discharge trough section 11 of the conveyor moves to one side or the other of the longitudinal center of the conveyor, to maintain a uniform tension on the conveying elements in all positions of lateral adjustment of the discharge trough section 11 with respect to the longitudinal centerline of the machine.

Referring now in particular to the synchronizing means for driving the sprocket drive shaft 53 and sprocket 33 thereon from the motor 63, and for maintaining the flights 21 in their interdigitating relationship in all positions of lateral adjustment of the discharge trough section 11, with respect to the longitudinal centerline of the conveyor, the universal coupling 57 is driven through an extensible synchronizing drive shaft 79, extending beneath the bottom plate 12 transversely of the discharge trough section 11. The extensible drive shaft 79 in turn is driven from the shaft 71 through a universal coupling 80, like the universal coupling 57. The universal couplings 57 and 80 may be conventional forms of universal couplings, so need not herein be shown or described in detail.

The drive shaft 53 is thus driven in timed relation with respect to the drive shaft 74 at the same rate of speed as the drive shaft 74 through the extensible drive shaft 79 and universal couplings 57 and 80, regardless of the relative positions of the drive sprockets 33 with respect to their respective side plates 13. Thus, when the discharge trough section 11 is aligned with the longitudinal centerline of the machine, the flights 21 of one conveying element will be midway between the flights 21 of the next adjacent conveying element as shown in FIGURE 1. As the discharge trough section 11 moves to one side or the other of the longitudinal centerline of the machine, one drive sprocket 33 will be moved outwardly along its associated conveyor side plate 13, while the other drive sprocket 33 will be moved inwardly along its associated trough section side plate 13, with the result that the flights will move closer to each other as the path of travel of one conveying element 19 lengthens and the path of travel of the opposite conveying element 19 shortens.

The extensible drive shaft 59, therefore, besides serving as a means for driving the sprocket 33 which in FIGURE 3 will be the left hand drive sprocket when looking toward the rear of the machine, also serves as a timing member or synchronizer to assure the same speeds of travel of the conveying elements 19 and to maintain such a relationship between proximate flights on adjacent of the conveyor chains to prevent interference of the proximate flights with each other during operation of the conveyor.

While we have herein shown and described one form in which our invention may be embodied, it should be understood that various modifications and variations in the invention may be attained without departing from the spirit and scope of the novel concepts thereof, as defined by the claims appended hereto.

We claim as our invention:

1. A conveyor comprising a laterally swingable conveyor trough, two laterally flexible endless conveyor chains guided for movement along said trough in side by side relation with respect to each other, flights mounted on and extending laterally of said chains, the flights on one of said chains extending into the spaces between the flights on the other of said chains, an individual drive sprocket for each chain, means mounting said drive sprockets on said trough for limited slidable movement therealong, means controlling movement of said drive sprockets along said trough as said trough swings laterally to maintain a uniform tension on said chains in all positions of lateral adjustment of said laterally swingable trough, and synchronizing means interconnecting said sprockets, accommodating limited slidable movement of said sprockets with respect to each other and locating said chains relative to each other in predetermined relationship and confining the positions of proximate flights on adjacent of said chains to a predetermined range with respect to each other.

2. A conveyor comprising a laterally swingable conveyor trough, two laterally flexible endless conveyor chains guided for movement along said trough in side by side relation with respect to each other, longitudinally spaced flights mounted on and extending laterally of said chains, the flights on one of said chains extending into the spaces between the flights on the other of said chains, an individual drive sprocket for each chain at the rear end of said laterally swingable trough, means mounting said sprockets on said trough for limited slidable movement therealong, means controlling movement of said sprockets along said trough as said trough is swung laterally, to maintain a uniform tension on said chains in all positions of lateral adjustable movement of said trough to one side or the other of the longitudinal center of the conveyor, driving means for said sprockets including synchronizing means connected between said sprockets to effect a synchronized drive means from the drive means for driving one sprocket to drive the other sprocket, said drive means accommodating slidable movement of said sprockets with respect to each other and confining the positions of proximate flights on adjacent of said chains to a predetermined range of movement with respect to each other.

3. A conveyor comprising a laterally swingable conveyor trough, two laterally flexible endless conveyor chains guided for movement along said trough in side by side relation with respect to each other, flights mounted on and extending laterally of said chains, the flights on one of said chains extending into the spaces between the flights on the other of said chains, an individual drive sprocket for each chain, means mounting said sprockets on said trough for limited slidable movement therealong, means controlling movement of said sprockets along said trough as said trough is swung laterally, to maintain a uniform tension on said chains in all positions of lateral adjustable movement of said trough with respect to the longitudinal center of the conveyor, a motor, a geared drive connection from said motor to one of said sprockets, and a synchronizing drive connection from said geared drive connection to the other of said sprockets maintaining the positions of proximate flights on adjacent of said chains at a predetermined range in all positions of lateral swingable adjustable movement of said trough section with respect to the longitudinal center of the conveyor, said synchronizing drive connection including an extensible drive shaft extending transversely of said laterally swingable trough, and universal drive connections between the geared drive train for driving one of said sprockets and said extensible shaft, and between said extensible shaft and the other of said sprockets and accommodating relative movement of said sprockets with respect to each other along said trough.

4. A conveyor comprising a laterally flexible conveyor trough having a bottom plate and vertically extending side walls extending along opposite sides thereof, two laterally flexible endless conveyor chains guided for movement along said bottom plate to convey material therealong, said chains having longitudinally spaced flights extending laterally therefrom, the flights on one of said chains extending into the spaces between the flights on the other of said chains, an individual drive sprocket for each chain spaced rearwardly of said bottom plate, movable support means mounting said sprockets on said trough for limited slidable movement therealong and guided for movement along the outer sides of said side plates and including gear housings having gear trains journalled therein for driving said sprockets, a motor mounted on one of said housings for driving one of said gear trains, cam and follower means connected with said gear housings for moving and controlling slidable movement of said gear housings along said side plates as said trough section is swung to one side of the other of the longitudinal center of the conveyor, to maintain uniform tensions on said chains, and a synchronizing drive connection between the gear train in one of said housings to the gear train in the opposite of said housings, for effecting a drive to both of said sprockets from said motor at substantially the same rates of speed in all positions of said laterally swingable trough section with respect to the longitudinal center of the machine and relative movement of said sprockets with respect to each other along said trough, and thereby maintaining the relative positions of proximate flights on adjacent of said chains at a predetermined range of travel with respect to each other.

5. A conveyor comprising a laterally flexible conveyor trough having a bottom plate and vertically extending side walls extending along opposite sides thereof, two laterally flexible endless conveyor chains guided for movement along said bottom plate to convey material therealong, said chains having longitudinally spaced flights extending laterally therefrom, the flights on one of said chains extending into the spaces between the flights on the other of said chains, an individual drive sprocket for each chain spaced rearwardly of said bottom plate, movable support means mounting said sprockets on said trough for limited slidable movement therealong and guided for movement along the outer sides of said side plates and including gear housings having gear trains journalled therein for driving said sprockets, a motor mounted on one of said housings for driving one of said gear trains, cam and follower means connected with said gear housings for moving and controlling slidable movement of said gear housings along said side plate as said trough section is swung to one side or the other of the longitudinal center of the conveyor, to maintain a uniform tension on said chains, and a synchronizing drive connection between the gear train in one of said housings to the gear train in the opposite of said housings, for effecting a drive to both of said sprockets from said motor at substantially the same rates of speed in all positions of said laterally swingable trough section with respect to the longitudinal center of the machine and in all relative positions of said sprockets with respect to said trough, and thereby maintaining the relative positions of proximate flights on adjacent of said chains at a predetermined range of travel with respect to each other, comprising an extensible drive shaft extending transversely of said trough section beneath said bottom plate, a universal drive connection from one of said gear trains to one end of said shaft and a universal drive connection from said shaft to the opposite of said gear trains.

References Cited in the file of this patent

UNITED STATES PATENTS

| 1,987,261 | MacEachen | Jan. 8, 1935 |
| 2,113,733 | Kraft | Apr. 12, 1938 |
| 2,232,081 | Sloane | Feb. 18, 1941 |
| 2,263,458 | Gellatly | Nov. 18, 1941 |
| 2,856,061 | Seigle et al. | Oct. 14, 1958 |